United States Patent
Schomaker et al.

(10) Patent No.: US 6,959,846 B2
(45) Date of Patent: Nov. 1, 2005

(54) MOTOR VEHICLE BOX AND PICKUP TRUCK

(75) Inventors: Jerome A. Schomaker, Granger, IN (US); Dean Mettler, Sturgis, MI (US); James Weiderman, Sturgis, MI (US); Daniel Wort, Elkhart, IN (US)

(73) Assignee: Lund International, Inc., Anoka, MN (US)

( * ) Notice: Subject to any disclaimer, the term of this patent is extended or adjusted under 35 U.S.C. 154(b) by 7 days.

(21) Appl. No.: 10/284,038

(22) Filed: Oct. 29, 2002

(65) Prior Publication Data

US 2004/0079777 A1 Apr. 29, 2004

(51) Int. Cl.$^7$ .................................................. B60R 9/00
(52) U.S. Cl. ...................... 224/404; 220/324; 220/835; 292/DIG. 43; 292/DIG. 65
(58) Field of Search ............................... 224/404, 403, 224/402, 401, 400; 220/324, 326, 833, 835, 210; 292/21, DIG. 43, DIG. 65

(56) References Cited

U.S. PATENT DOCUMENTS

| | | | | |
|---|---|---|---|---|
| 3,586,360 A | * | 6/1971 | Perrotta | 292/26 |
| 3,640,423 A | * | 2/1972 | Parker et al. | 220/324 |
| 4,080,812 A | * | 3/1978 | Knott | 292/DIG. 43 |
| 5,308,126 A | * | 5/1994 | Weger et al. | 292/53 |
| 5,445,326 A | * | 8/1995 | Ferro et al. | 292/DIG. 43 |
| 5,601,206 A | * | 2/1997 | Haas et al. | 224/404 |
| 5,875,948 A | * | 3/1999 | Sadler | 224/404 |
| 5,924,616 A | * | 7/1999 | Shives | 224/404 |
| 6,135,514 A | * | 10/2000 | Kowalewski et al. | 292/216 |
| 6,394,511 B1 | * | 5/2002 | Lam et al. | 292/DIG. 43 |
| 6,454,320 B1 | * | 9/2002 | Weinerman et al. | 292/56 |
| 6,581,989 B2 | * | 6/2003 | Markisello | 292/DIG. 43 |
| 6,742,818 B2 | * | 6/2004 | Seki et al. | 292/DIG. 65 |

OTHER PUBLICATIONS

"Diamond Brite Tool Boxes by Challenger", Delta III, Inc., front cover, p. 1–2, back cover (Date Unknown).
"DeeZee: The Quality Truck Accessory People: 1993 Catalog", DeeZee, Inc., front cover, pp. 1–23, back cover (1993).
"Deflecta–Shield Aluminum Products", Lund International, front cover, pp. 1–13, back cover (2001–2002).

* cited by examiner

Primary Examiner—Nathan J. Newhouse
(74) Attorney, Agent, or Firm—Merchant & Gould P.C.

(57) ABSTRACT

A motor vehicle box and a pickup truck having a motor vehicle box provided in the pickup truck bed are provided. The motor vehicle box includes a plurality of sidewalls and a bottom wall constructed to form a container having an opening wherein the container has an exterior side and an interior side; a lid constructed to cover the opening, wherein the lid is hingedly attached to at least one of the plurality of walls; and a latch mechanism comprising a latch member constructed and arranged to move between a first position and second position. The first position is provided for holding the lid in place covering the opening. The second position is provided for releasing the lid. The latch mechanism includes an exterior latch release mechanism and an interior latch release mechanism. The exterior latch release mechanism extends to the exterior side of the container and is constructed to move the latch member to the second position when triggered. The interior latch release mechanism is provided within the interior side of the container and is constructed to move the latch member to the second position when triggered. The interior latch release mechanism allows someone, such as a small child, who becomes trapped in the box to release himself or herself from the box by using the interior latch release mechanism.

8 Claims, 7 Drawing Sheets

MOTOR VEHICLE BOX AND PICKUP TRUCK

FIELD OF THE INVENTION

The invention relates to a motor vehicle box having an interior latch release mechanism and to a pickup truck having a motor vehicle box provided in the pickup truck bed. In particular, the interior latch release mechanism allows for opening the box from inside the motor vehicle box in the event a child finds himself or herself inside the box.

BACKGROUND OF THE INVENTION

Motor vehicle boxes are often found in pickup truck beds. The motor vehicle boxes are often located behind the cab of a pickup truck and extend from one sidewall of the bed the other sidewall. People often use the boxes for storing tools or other items that should be protected from elements or protected from theft. Pickup truck bed boxes are available from Lund Industries, Incorporated; Delta Consolidated, Incorporated; DeeZee, Inc.; and United Welding Supply.

SUMMARY OF THE INVENTION

A motor vehicle box and a pickup truck having a motor vehicle box provided in the pickup truck bed are provided. The motor vehicle box includes a plurality of sidewalls and a bottom wall constructed to form a container having an opening wherein the container has an exterior side and an interior side; a lid constructed to cover the opening, wherein the lid is hingedly attached to at least one of the plurality of walls; and a latch mechanism comprising a latch member constructed and arranged to move between a first position and second position. The first position is provided for holding the lid in place covering the opening. The second position is provided for releasing the lid. The latch mechanism includes an exterior latch release mechanism and an interior latch release mechanism. The exterior latch release mechanism extends to the exterior side of the container and is constructed to move the latch member to the second position when triggered. The interior latch release mechanism is provided within the interior side of the container and is constructed to move the latch member to the second position when triggered. The interior latch release mechanism allows someone, such as a small child, who becomes trapped in the box to release himself or herself from the box by using the interior latch release mechanism.

DETAILED DESCRIPTION

Figure 1:
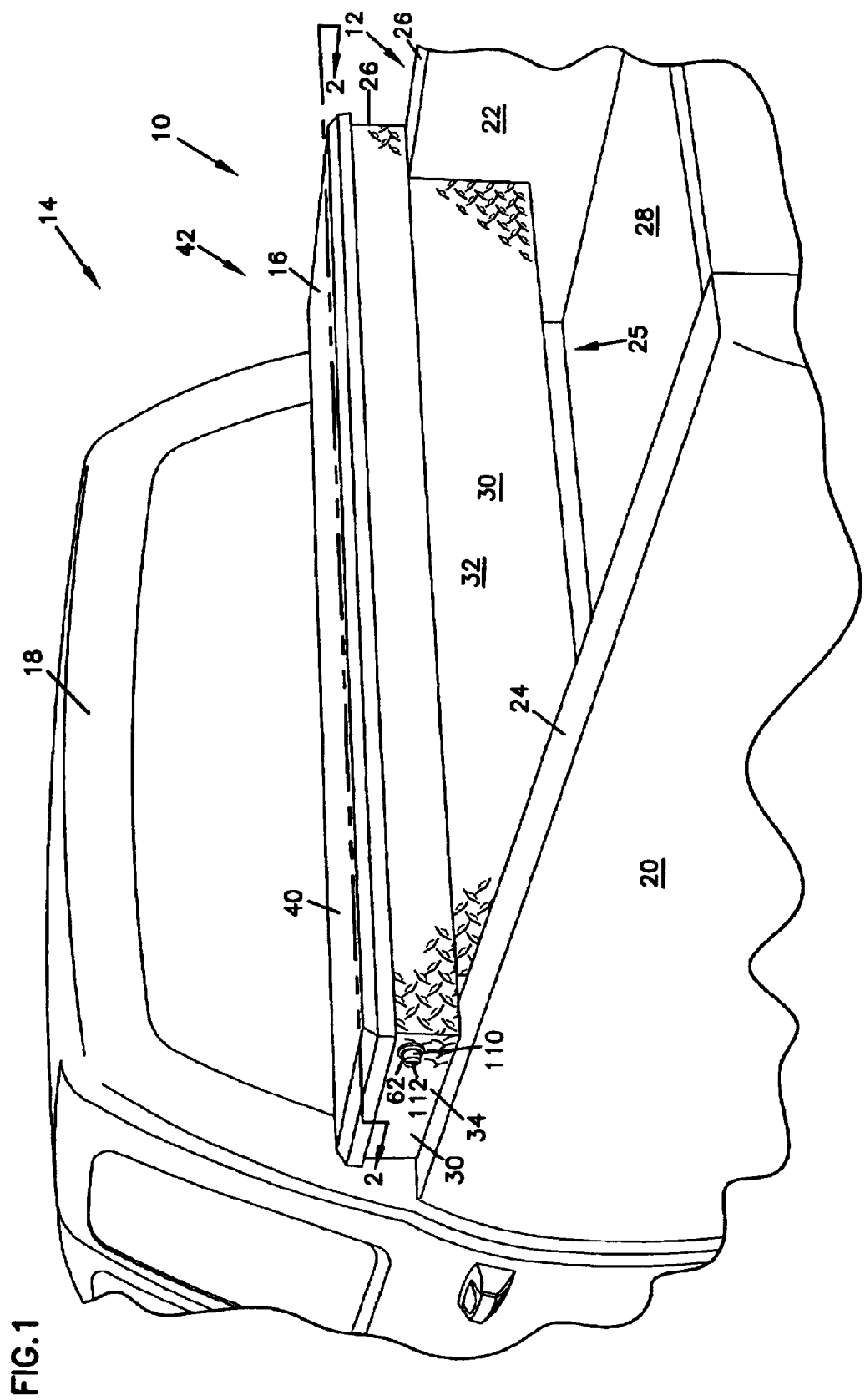
FIG. 1 is a perspective view of a motor vehicle box provided in the bed of a pickup truck according to the principles of the invention.

Referring to FIG. 1, a motor vehicle box is shown at reference number 10 in the bed 12 of a pickup truck 14. The motor vehicle box 10 shown is a truck bed box 16 because it is constructed to fit in a pickup truck bed 12. The truck bed box can be constructed to fit directly behind the pickup truck cab 18 and between the pickup truck left bed sidewall 20 and the pickup truck bed right sidewall 22. The truck bed box 16 can be referred to as the box. The box 16 is shown having a construction that extends between the left pickup truck sidewall 20 and the right pickup truck sidewall 22, and over the left pickup truck sidewall top surface 24 and the right pickup truck sidewall top surface 26. The box 16 can be attached to the pickup truck 12 in a manner that is conventional for truck bed boxes. In addition, a gap 25 can be provided between the box 16 and the pickup truck bed floor 28. It should be understood that the box 16 can be provided in a different location in the pickup truck bed 12. For example, the box 16 can be provided along the left pickup truck sidewall 20 or the right pickup truck sidewall 22. In addition, the box 16 can have a different configuration than that shown in FIG. 1. In general, the box 16 is fastened in place in the pickup truck bed 12 so that it does not move around during operation of the pickup truck. In addition, the box 16 can be provided as an accessory that can be attached to the pickup truck bed 12 and later detached.

The structure and operation of the box 16 can be seen in reference to FIGS. 1–6. The box 16 includes a plurality of sidewalls 30. The box 16 includes a rear sidewall 32, a left sidewall 34, a right sidewall 36, and a front sidewall (not shown) facing the pickup truck cab 18. In addition, the box includes a bottom wall 38 and a lid 40. The lid 40 can be hingedly attached to one of the sidewalls. The walls and the lid of the box 16 can be identical to the walls and lid of prior art boxes that are available from Lund Industries, Incorporated; Delta Consolidated, Incorporated; DeeZee, Inc.; and United Welding Supply. A common material that is available for manufacturing boxes can be referred to as diamond plate aluminum. This type of material can be used to manufacture the walls, bottom and lid of the box according to the invention. The lid 40 can be manufactured according to U.S. application Ser. No. 10/210,784 that was filed with United States Patent and Trademark Office on Jul. 31, 2002. The entire disclosure of U.S. application Ser. No. 10/210,784 is incorporated herein by reference.

Figure 5:
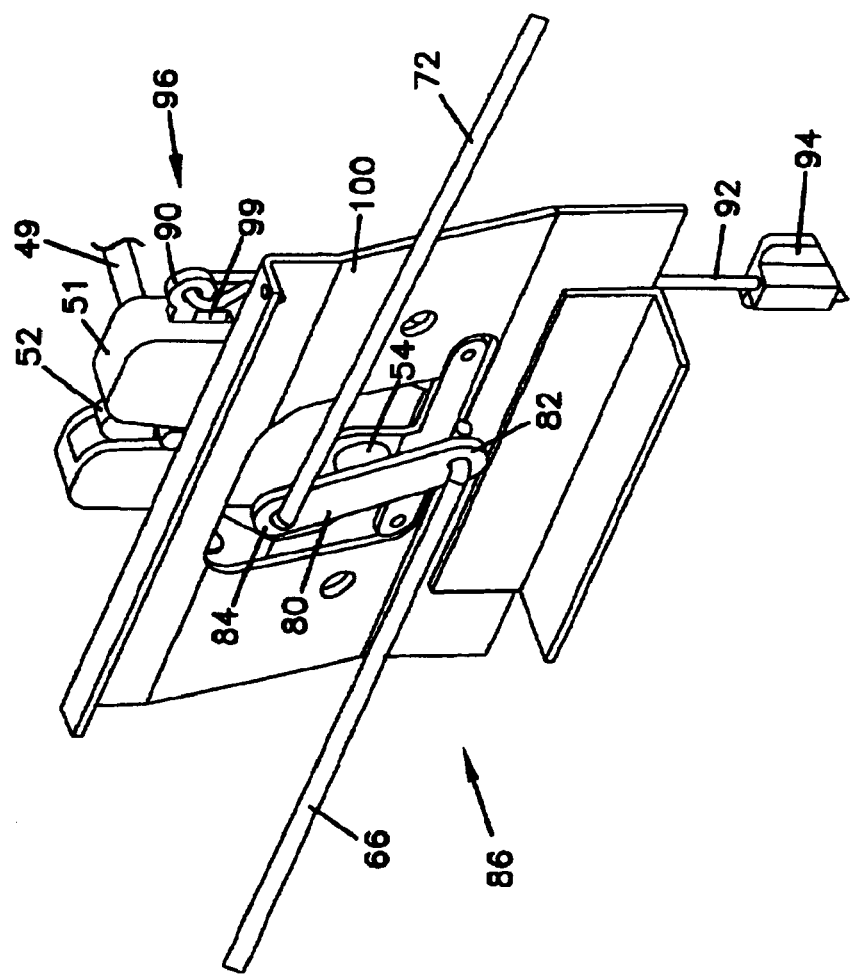
FIG. 5 is a rear, perspective view of the latch release mechanism of FIG. 2.

The box 16 includes a latch mechanism 50 that provides for latching the lid 40 in a closed position 42 and, when triggered, for releasing the lid 40. The latch mechanism 50 is shown latching the lid 40 to the rear sidewall 32. As shown in FIG. 5, a pin 49 is provided extending from the lid 40 and engaging the latch mechanism 50. It should be appreciated that the latch mechanism 50 can be provided so that it latches the lid 40 to any of the sidewalls 30. The latch mechanism 50 includes a housing 51, a latch member 52 and a latch release member 54. The latch member 52 can be spring-loaded and engages the pin 49 when the lid 40 is provided in the closed position 42. In general, the latch member 52 engages the pin 49, provided in the lid 40, and the latch release member 54 causes the latch member 52 to disengage the pin 49 when the latch release member 54 is triggered.

The latch release member 54 can be triggered or activated by an exterior latch release mechanism 56 and/or an interior latch release mechanism 58. It is expected that the exterior latch release mechanism 56 will be the mechanism most commonly used when opening the box 16. The interior latch release mechanism 58 is provided in the event that a person, such as a small child, finds himself or herself inside the box 16 with the lid 40 provided in the closed position 42. The person inside the box 16 will be able to trigger the interior latch release mechanism 58 in order to get out of the box 16.

Figure 2:
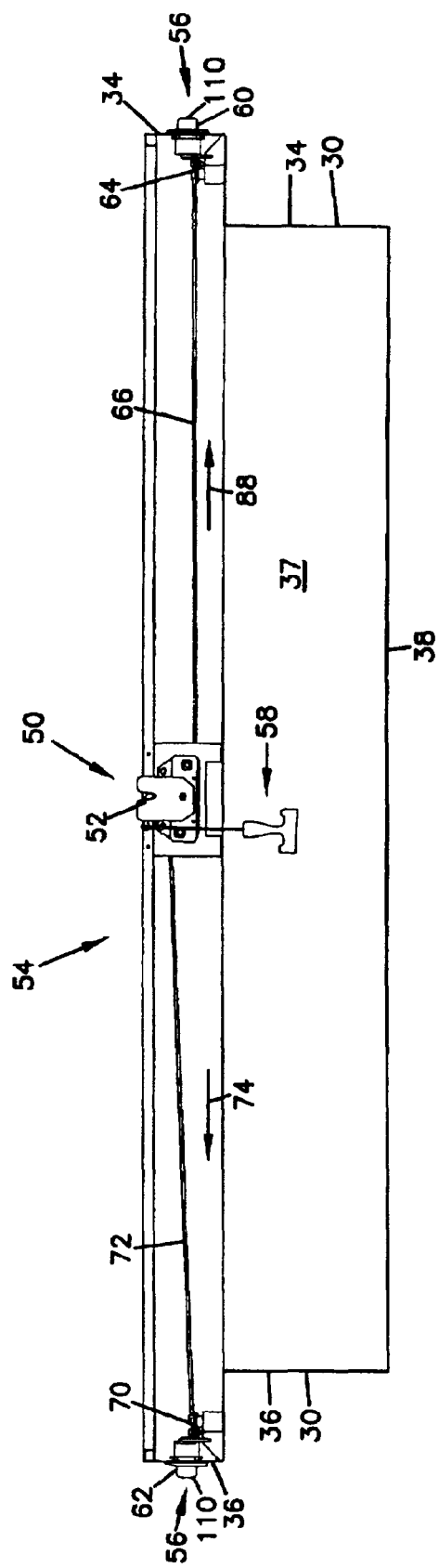
FIG. 2 is a sectional view of the box of FIG. 1 taken along lines 2—2 showing the latch mechanism with the lid removed.
Figure 4:
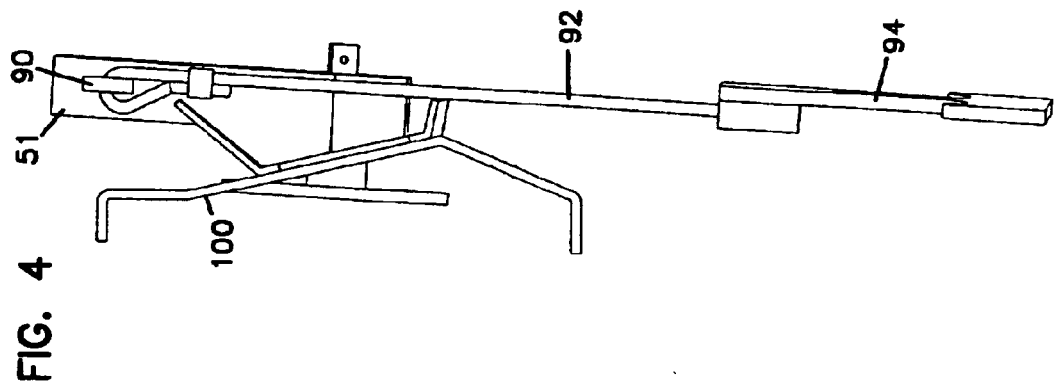
FIG. 4 is a side view of the latch release mechanism of FIG. 2.
Figure 3:
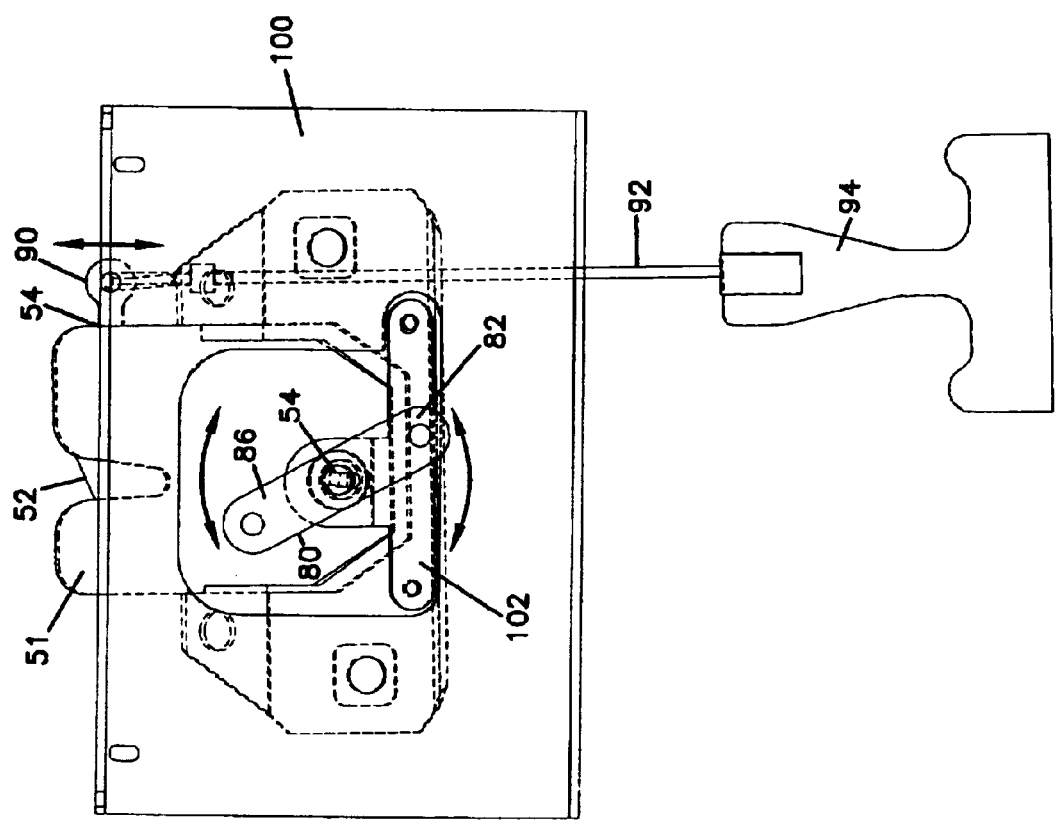
FIG. 3 is a rear view of the latch release mechanism of FIG. 2.
Figure 6:
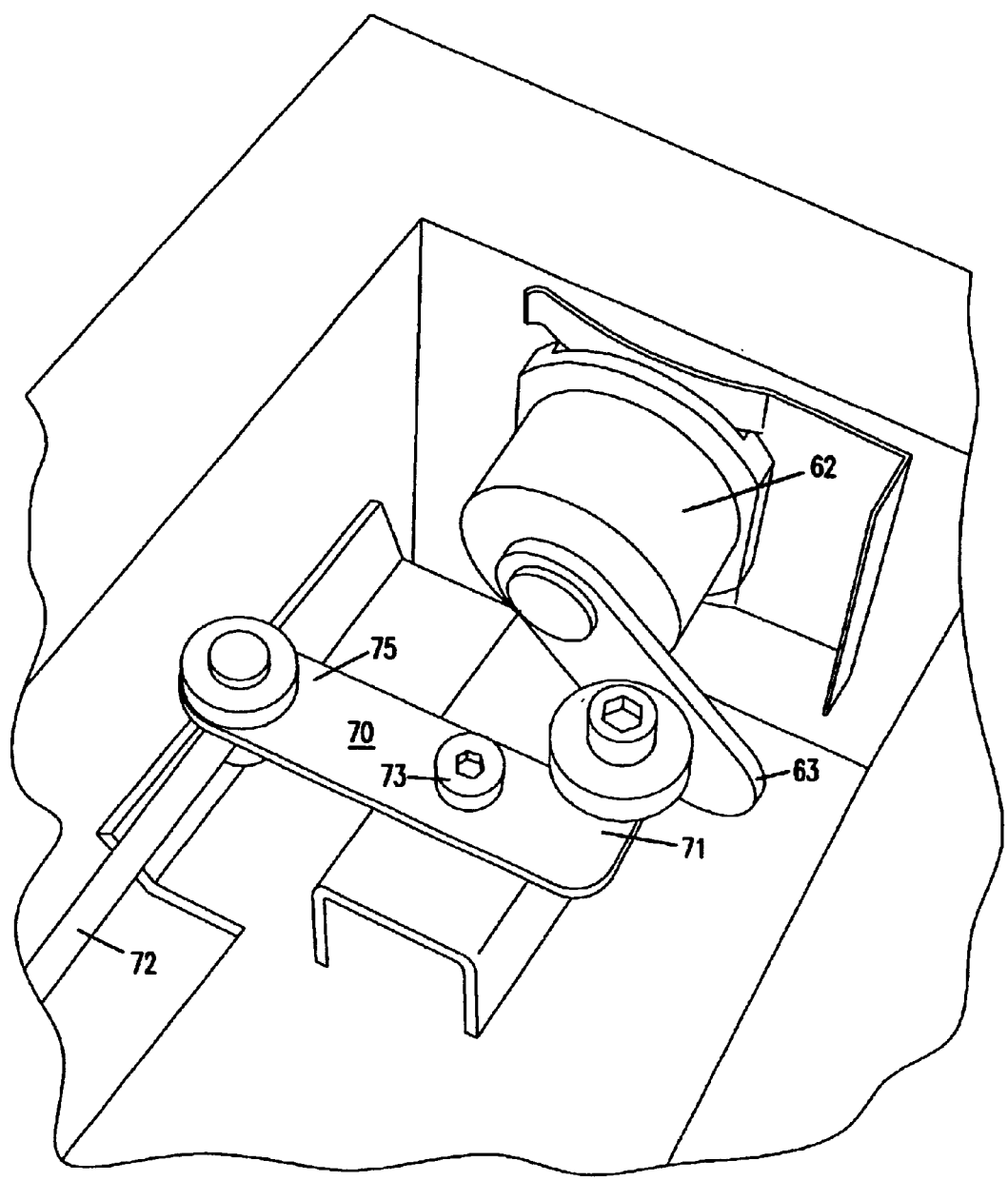
FIG. 6 is a perspective view of the exterior latch release mechanism of FIG. 2.

The exterior latch release mechanism 56 can be triggered by depressing either or both of the buttons 60 and 62. As shown in FIGS. 2 and 6, depressing the button 62 moves the cam 70 causing the extension rod 72 to move in the direction of the arrow 74. The button 62 can include an extension or offset arm 63 that engages the first end 71 of the cam 70. By anchoring the cam 70 at the rotation location 73, the cam second end 75 can be provided to move through a desired degree of rotation. Similarly, depressing the button 60 causes the cam 64 to move the extension rod 66 in the direction of the arrow 68.

The extension rod 66 and the extension rod 72 attached to the latch arm 80 at the first attachment location 82 and the second attachment location 84, respectively. As the extension rod 66 and the extension rod 72 move in the direction of the arrows 68 and 74, the latch arm 80 rotates between the first latch position 86 and a second latch position provided when the latch arm 80 moves according to the arrows in FIG. 3. Accordingly, when the latch arm 80 is provided in the first latch position 86, the lid 40 is capable of being latched in the closed position 42. When the latch arm 80 is provided in the second latch position, the lid 40 can be opened. Moving the latch arm 80 to the second latch position causes the latch release member 54 to disengage the latch member 52 from the pin 49.

The interior latch release mechanism 58 includes a lever arm 90, a line 92 extending from the lever arm 90, and a handle 94 attached to the line 92. A person can simply pull the handle 94 to cause the lever arm 90 to move between the first lever arm position 96 and the second lever on position provided when the lever arm 90 moves downward as shown by the arrow in FIG. 3. The limit of movement of the lever arm 90 can be determined by the size of the gap 99 shown in FIG. 5. The first lever arm position 96 allows the lid 40 to be latched in place in the closed position 42. The second lever arm position allows the lid 40 to be released so that the box 16 can be opened. The movement of the lever arm 90 to the second lever position causes the latch release member 54 to disengage the latch member 52 from the pin 49.

The handle 94 can be provided from a material that glows in the dark. That is, the material used to form the handle 94 can be a material that gives off a sufficient amount of light when the lid 40 is attached to the rear sidewall 32 so that a person trapped within the box 16 will see the handle 94 and reach out to grab the handle and pull on it.

The latch mechanism 50 can be attached to the rear sidewall 32 by the bracket assembly 100. The bracket 102 can be provided to help attach the latch mechanism 50 to the bracket assembly 100.

The exterior latch release mechanism 56 can be used in combination with a locking mechanism 110. The locking mechanism 110 can be locked and unlocked using a key that engages a keyhole 112. In addition, the locking mechanism 110 can be activated using an electronic control such as an electronic key fob.

Figure 7:
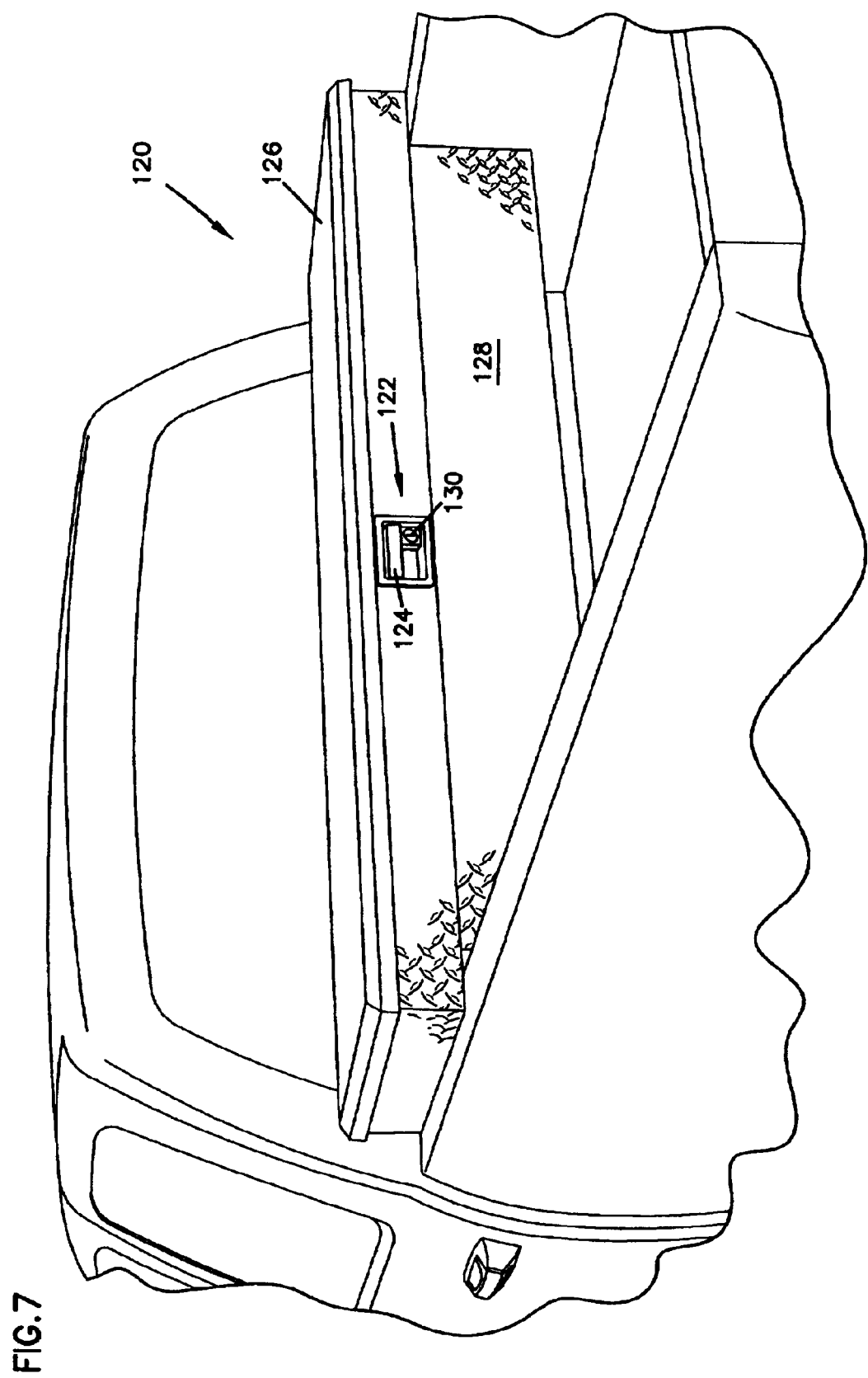
FIG. 7 is a perspective view of an alternative design of a motor vehicle box provided in the bed of a pickup truck according to the principles of the invention.

FIG. 7 shows an alternative design of a box 120 according to the principles of the invention. The box 120 includes a latch mechanism 122 having a lever 124 that, when lifted, releases the cover 126 from the box body 128. The latch mechanism 122 can include a keyhole 130 for locking and unlocking the box 120. In addition, the box 120 can be locked and unlocked using an electronic control such as an electronic key fob.

Figure 8:
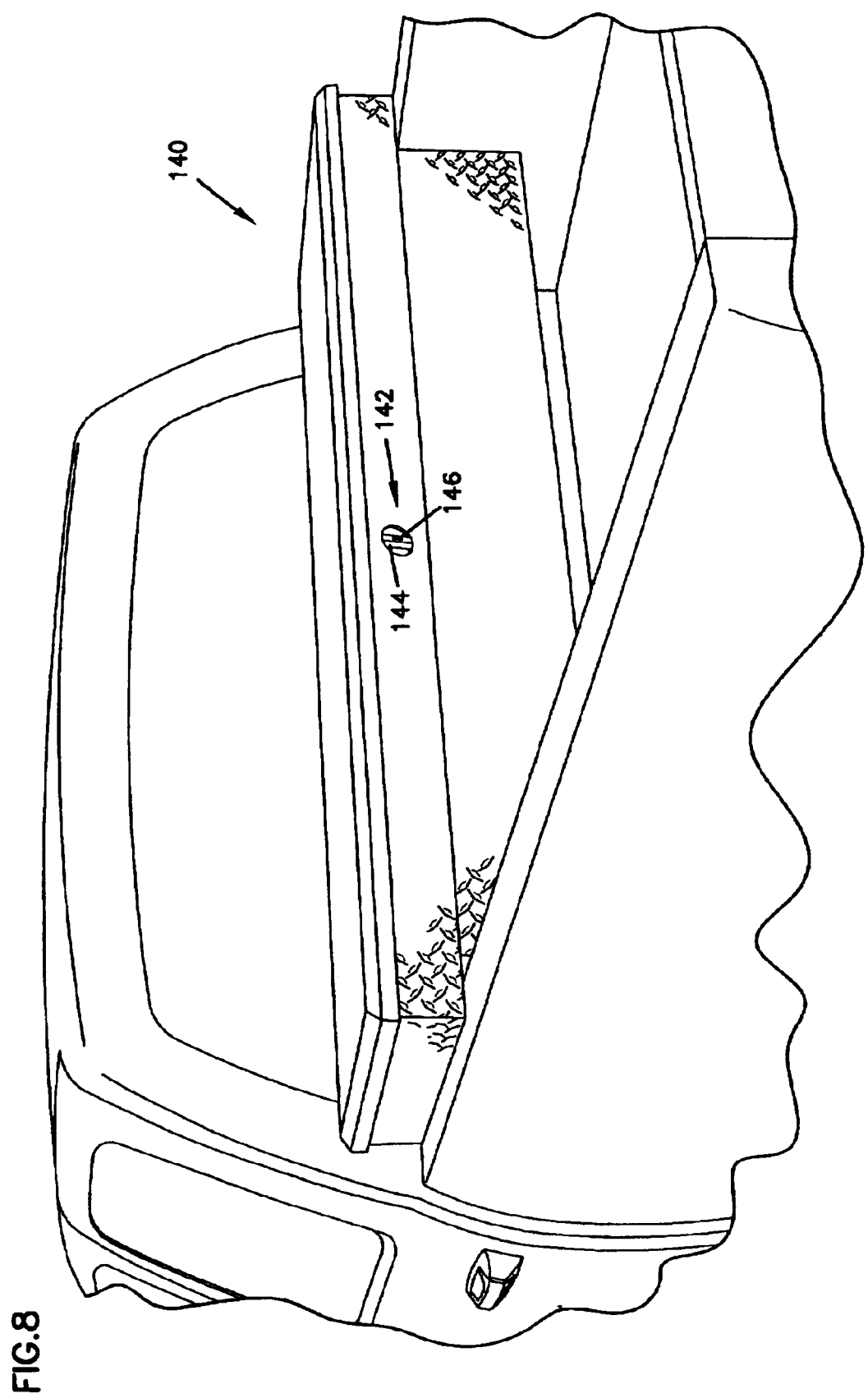
FIG. 8 is a perspective view of an alternative design of a motor vehicle box provided in the bed of a pickup truck according to the principles of the invention.

FIG. 8 shows an alternative embodiment of a box 140 according to the principles of the invention. The box 140 includes a latch mechanism 142 that is provided as a rotating knob 144. The rotating knob can be locked and unlocked via the keyhole 146. In addition, the box 140 can be locked and unlocked using an electronic control such as an electronic key fob.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A motor vehicle box comprising:
   (a) a plurality of sidewalls and a bottom wall constructed to form a container having an opening wherein the container has an exterior side and an interior side;
   (b) a lid constructed to cover the opening, wherein the lid is hingedly attached to at least one of the plurality of sidewalls; and
   (c) a latch mechanism comprising a latch member constructed and arranged to move between a first position and a second position, the first position being provided for holding the lid in place covering the opening and the second position being provided for releasing the lid, wherein the latch mechanism comprises:
      (i) an exterior latch release mechanism that extends to the exterior side of the container and constructed to move the latch member to the second position when triggered; and
      (ii) an interior latch release mechanism provided within the interior side of the container and constructed to move the latch member to the second position when triggered, the interior latch release mechanism comprising a lever arm, a line, and a handle, wherein pulling the handle causes the lever arm to move in a downward direction and move the latch member from the first position to the second position;
   (d) wherein the motor vehicle box is constructed to fit in a pickup truck bed.

2. A motor vehicle box according to claim 1, wherein the exterior latch release mechanism comprises a button accessible from the exterior side of the container, that, when depressed, causes the latch member to move to the second position.

3. A motor vehicle box according to claim 1, wherein the exterior latch release mechanism comprises a lever accessible from the exterior side of the container, that, when depressed, causes the latch member to move to the second position.

4. A motor vehicle box according to claim 1, wherein the exterior latch release mechanism comprises a knob accessible from the exterior side of the container, that, when turned, causes the latch member to move to the second position.

5. A pickup truck having a bed comprising a bed floor, a left bed sidewall, a right bed sidewall, and a motor vehicle box attached to the pickup truck in the pickup truck bed, wherein the motor vehicle box comprises:
   (a) a plurality of sidewalls and a bottom wall constructed to form a container having an opening wherein the container has an exterior side and an interior side;

(b) a lid constructed to cover the opening, wherein the lid is hingedly attached to at least one of the plurality of sidewalls; and (c) a latch mechanism comprising a latch member constructed and arranged to move between a first position and a second position, the first position being provided for holding the lid in place covering the opening and the second position being provided for releasing the lid, wherein the latch mechanism comprises:

(i) an exterior latch release mechanism that extends to the exterior side of the container and constructed to move the latch member to the second position when triggered; and (ii) an interior latch release mechanism provided within the interior side of the container and constructed to move the latch member to the second position with triggered, the interior latch release mechanism comprising a lever arm, a line, and a handle, wherein pulling the handle causes the lever arm to move in a downward direction and move the latch member from the first position to the second position.

6. A pickup truck according to claim 5, wherein the exterior latch release mechanism comprises a button accessible from the exterior side of the container, that, when depressed, causes the latch member to move to the second position.

7. A pickup truck according to claim 5, wherein the exterior latch release mechanism comprises a lever accessible from the exterior side of the container, that, when depressed, causes the latch member to move to the second position.

8. A pickup truck according to claim 5, wherein the exterior latch release mechanism comprises a knob accessible from the exterior side of the container, that, when turned, causes the latch member to move to the second position.

* * * * *